US012161595B2

(12) United States Patent
Galer et al.

(10) Patent No.: US 12,161,595 B2
(45) **Date of Patent: *Dec. 10, 2024**

(54) PATIENT SUPPORT

(71) Applicant: Stryker Corporation, Kalamazoo, MI (US)

(72) Inventors: James K. Galer, Byron Center, MI (US); Justin Jon Raymond, Jackson, MI (US); Richard I. Palmisano, Kalamazoo, MI (US); Patrick Lafleche, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/545,212

(22) Filed: Dec. 8, 2021

(65) Prior Publication Data

US 2022/0096300 A1 Mar. 31, 2022

Related U.S. Application Data

(63) Continuation of application No. 16/585,641, filed on Sep. 27, 2019, now Pat. No. 11,219,567.

(Continued)

(51) Int. Cl.
*A61G 7/057* (2006.01)
*A61G 7/07* (2006.01)

(52) U.S. Cl.
CPC ...... *A61G 7/05792* (2016.11); *A61G 7/05769* (2013.01); *A61G 7/07* (2013.01)

(58) Field of Classification Search
CPC .. A61G 7/05792; A61G 7/07; A61G 7/05769; A47C 21/044
See application file for complete search history.

(56) References Cited

U.S. PATENT DOCUMENTS 3,486,177 A 12/1969 Marshack
3,529,310 A 9/1970 Olmo
(Continued)

FOREIGN PATENT DOCUMENTS

GB 2405582 A 3/2005
WO 95007679 A2 3/1995

OTHER PUBLICATIONS

Stryker Medical, "Isolibrium Support Surface Specification Sheet", Rev. E.4, Nov. 2013, 2 pages.
(Continued)

*Primary Examiner* — Eric J Kurilla
(74) *Attorney, Agent, or Firm* — Howard & Howard Attorneys PLLC

(57) ABSTRACT

A patient support includes a conformable layer having a lattice of cells. Each cell having a base and extending to a top portion disposed opposite the base to form a column, and at least some of the cells within the lattice having a fluid passage extending from the base through the top portion of the cell. The patient support having a fluid flow path defined by a port connector configured to direct a fluid to a low air loss manifold, the low air loss manifold configured to direct and release the fluid towards the fluid passages of the conformable layer with the fluid passages configured to direct the fluid into a reduced zone having a surface area, and a spacer layer configured to receive the fluid in the reduced zone and disperse the fluid underneath a cover across a surface area larger than the surface area of the reduced zone.

19 Claims, 10 Drawing Sheets

Related U.S. Application Data

(60) Provisional application No. 62/738,158, filed on Sep. 28, 2018.

(56) References Cited

U.S. PATENT DOCUMENTS

| | | | | |
|---|---|---|---|---|
| 3,940,811 | A | 3/1976 | Tomikawa et al. | |
| 4,605,582 | A | 8/1986 | Sias et al. | |
| 4,665,573 | A | 5/1987 | Fiore | |
| 4,947,500 | A | 8/1990 | Seiler | |
| 5,007,124 | A | 4/1991 | Raburn et al. | |
| 5,179,742 | A | 1/1993 | Oberle | |
| 5,180,619 | A | 1/1993 | Landi et al. | |
| 5,617,595 | A | 4/1997 | Landi et al. | |
| 5,640,728 | A | 6/1997 | Graebe | |
| 5,794,289 | A | 8/1998 | Wortman et al. | |
| 6,115,861 | A | 9/2000 | Reeder et al. | |
| 6,487,739 | B1 | 12/2002 | Harker | |
| 6,701,556 | B2 | 3/2004 | Romano et al. | |
| 6,701,558 | B2 | 3/2004 | VanSteenburg | |
| 6,718,584 | B2 | 4/2004 | Rabaiotti et al. | |
| 7,666,341 | B2 | 2/2010 | Pearce | |
| 7,886,386 | B2 | 2/2011 | Balonick et al. | |
| 7,914,611 | B2 | 3/2011 | Vrzalik et al. | |
| 8,069,514 | B2 | 12/2011 | Poulos et al. | |
| 8,108,957 | B2 | 2/2012 | Richards et al. | |
| 8,117,701 | B2 | 2/2012 | Bobey et al. | |
| 8,118,920 | B2 | 2/2012 | Vrzalik et al. | |
| 8,235,922 | B2 | 8/2012 | Rowe et al. | |
| 8,372,182 | B2 | 2/2013 | Vrzalik et al. | |
| 8,490,233 | B2 | 7/2013 | Essers | |
| 8,832,883 | B2 | 9/2014 | Schwirian et al. | |
| 8,918,930 | B2 | 12/2014 | Stroh et al. | |
| 9,254,231 | B2 | 2/2016 | Vrzalik et al. | |
| 9,835,344 | B2 | 12/2017 | Vrzalik et al. | |
| 9,907,408 | B2 | 3/2018 | Vrzalik et al. | |
| 11,219,567 | B2 * | 1/2022 | Galer ................. | A61G 7/05792 |
| 2007/0143928 | A1 | 6/2007 | Biggie et al. | |
| 2008/0040860 | A1 | 2/2008 | Price et al. | |
| 2009/0013470 | A1 | 1/2009 | Richards et al. | |
| 2010/0146709 | A1 | 6/2010 | Lafleche et al. | |
| 2010/0212087 | A1 | 8/2010 | Leib et al. | |
| 2011/0163885 | A1 | 7/2011 | Poulos et al. | |
| 2017/0027791 | A1 | 2/2017 | McKnight et al. | |
| 2017/0254379 | A1 | 9/2017 | Whatcott | |
| 2020/0100967 | A1 | 4/2020 | Galer et al. | |

OTHER PUBLICATIONS

Stryker Medical, "Isolibrium Support Surface Version 4.0, Ref 2971, Ref 2972 Maintenance Manual", Rev. B, May 2017, 88 pages.
Stryker Medical, "Isolibrium Support Surface Version 4.0, Ref 2971, Ref 2972 Maintenance Manual", Rev. C.2, Jul. 2017, 88 pages.
Stryker Medical, "Mattress Assembly Page—2235-100-001—Bariatric Bed Model 2230", Rev. A, 2 pages.
Stryker Medical, "P100/Sof Care Pump Ref 2880, Ref 2890 Service Manual", Oct. 2017, 8 pages.
Stryker Medical, "Position Pro Therapy Mattress Model 2920 Operations/Mainentance Manual", Rev. A, Feb. 2007, 55 pages.
Stryker Medical, "PositionPro Patient Repositioning Support Surface-Standalone with Pendant or Integrated with FL27 InTouch CC Model Beds Ref 2920 Maintenance Manual", Rev. A, Oct. 2016, 56 pages.
Stryker Medical, "PositionPro Patient Repositioning Support Surface-Standalone with Pendant or Integrated with FL27 InTouch CC Model Beds Ref 2920 Maintenance Manual", Rev. G, Oct. 2016, 42 pages.
Stryker Medical, "Pressure Management—Dynamic Mattress System 2500 Operations/Maintenance Manual", Aug. 1994, 17 pages.
Stryker Medical, "Pressure Management—Dynamic Mattress System 2500 Operations/Maintenance Manual", Aug. 1997, 23 pages.
Stryker Medical, "ProForm Non-Powered Support Surface Model 2710 Operations/Maintenance Manual", Rev. G, Sep. 14, 2015, 134 pages.
Stryker Medical, "Save Simply Brochure", 2018, 2 pages.
Stryker Medical, "Sof Care Chair Cushion Ref 2770-209-005 Operations Manual", Rev. D, Apr. 2016, 1 page.
Stryker Medical, "Sof Care DuoGard Overlay Brochure", 2015, 3 pages.
Stryker Medical, "SofCare Healthcare Boot, Ref 2760-100-000, Ref 2760-200-000, Ref 2760-300-000 Operations Manual", Rev. C, Mar. 2016, 2 pages.
Stryker Medical, "SofCare HeelCare Boot Series Specification Sheet", Rev. B.3, Aug. 2011, 2 pages.
Stryker Medical, SofCare Stretcher Overlay Ref 2780-400-000, Ref 2780-500-000 Operations Manual, Rev. B, Dec. 2014, 2 pages.
Stryker Medical, "SPR Plus Low Air Loss Overlay 3-Layer Technology Specification Sheet", Rev. D.2, Aug. 2011, 2 pages.
Stryker Medical, "SPR Plus Overlay Ref 2790-100-000 Operations Manual", Rev. B, Dec. 2014, 2 pages.
Stryker Medical, "Stryker Air I, Stryker Air II Low Air Loss Therapy Mattress (LAL), Model 2236 Operations/Maintenance Manual", Rev. B, May 2009, 30 pages.
Stryker Medical, "Stryker Air Pump Ref 2861 Service Manual", Rev. 2.0, Jun. 2016, 58 pages.
Stryker Medical, "Ultra Comfort SE Support Surface Ref. 1703; Ref. 1704 Operations Manual", Rev. D, May 2017, 40 pages.
Stryker Medical, "XPRT Pulmonary Therapy & Wound Care Mattress Model 2950 Operations/Maintenance Manual", Rev. C, Aug. 2007, 114 pages.
Stryker Medical, "XPRT Therapeutic Support Surface Ref 2950 Operations/Maintenance Manual", Rev. B, Jun. 2012, 468 pages.
Stryker Medical, XPRT Therapy Mattress Model 2950 Operations Manual, Rev. A, Jul. 2006, 98 pages.
Stryker Medical, "XPRT Therapy Mattress Model 2950 Operations/Maintenance Manual", Rev. A, May 2006, 98 pages.
Stryker Medical, "XPRT Therapy Mattress Model 2950 Operations/Maintenance Manual", Rev. H, Jun. 2006, 98 pages.
Stryker Medical, "DuoGard Overlay Ref 2780-300-000 Operations Manual", Rev. B, Dec. 2014, 1 page.
Gaymar Industries Inc., "Air Express Alternating Low Pressure Therapy Operator's Manual", Apr. 2014, 113 pages.
Gaymar Industries Inc., "Air Express C1000DF Service Manual", Jul. 2007, 16 pages.
Gaymar Industries Inc., "Air Express LAL P1500 Low Air Loss Therapy System Operator's Manual", Rev. B, Apr. 2010, 32 pages.
Gaymar Industries Inc., "Aire Twin Alternating Pressure and Low-Loss Therapy Mattress Replacement Systems ATC80, ATM500, ATM800, ATW5000, ATW8000 Operator's Manual", May 2005, 8 pages.
Gaymar Industries Inc., "Auto Aire Select Dynamic Low-Air Loss Therapy Service Manual", Rev. A, Apr. 2010, 28 pages.
Gaymar Industries Inc., "Auto Aire Select Dynamic Low-Air Loss Therapy With Alternating Pressure and Active Sensor Technology Ref C2500MS Control Unit, Ref M2500S Series Mattress, Ref Auto Aire Select Safety Mattress Service Manual", Rev. B, Sep. 2010, 14 pages.
Gaymar Industries Inc., "Auto Sure-Float Ref C1000MS/C1000MES Control Unit; Ref M1001S/M1002S Series Mattress Operator's Manual", Rev. B, Sep. 2010, 128 pages.
Gaymar Industries Inc., "Clini-Dyne Lateral Rotation System CLP2000 Control Unit, CLM Series Mattress Service Manual", Rev. A, Oct. 2010, 18 pages.
Gaymar Industries Inc., "Clini-Dyne Rotational Therapy System CLP2000 Control Unit, CLM Series Mattress Operator's Manual", Rev. A, Oct. 2010, 8 pages.
Gaymar Industries Inc., "EFF302 Alternating Pad Instructions", Rev. A, Jan. 2010, 1 page.
Gaymar Industries Inc., "Instructions for Use Sof Care Mattress Series", Rev. A, May 2010, 12 pages.
Gaymar Industries Inc., "O2 Zoned Multi-Functional Portable Rotation System P4000, P4001, C4000 Series Control Unit, M4000 Series Mattress Operator's Manual", Rev. B, Oct. 2010, 12 pages.

(56) References Cited

OTHER PUBLICATIONS

Gaymar Industries Inc., "Paradise Pump PAR 30 Config F Alternating Pressure Pump Functional Check Instructions", Rev. A, Apr. 2007, 1 page.
Gaymar Industries Inc., "Paradise Pump Series Operator's Manual", Sep. 2005, 8 pages.
Gaymar Industries Inc., "Plexus Auto Aire Select Dynamic Low-Air Loss Therapy With Alternating Pressure and Active Sensor Technology Ref C2500MES Control Unit, Ref M2500S Series Mattress, Ref X3580S Operator's Manual", Rev. B, Sep. 2010, 42 pages.
Gaymar Industries Inc., "Plexus O2 Zoned Multi-Functional Portable Rotation System C4000 Series Control Unit, M4000 or M4001 Series Mattress Service Manual", Rev. A, Oct. 2010, 40 pages.
Gaymar Industries Inc., "Plexus Ref P102 Plexus Jr. Alternating Pressure System, Ref C102 Plexus Jr. APM Control Unit, Ref M100 Alternating Pressure Mattress Overlay Instructions for Use", Rev. C, Apr. 2012, 20 pages.
Gaymar Industries Inc., "Pressure Pedic Pressure Redistribution Mattress Instructions for Use", Rev. B, Dec. 2009, 2 pages.
Gaymar Industries Inc., "SC505 Sof Care Inflator Operating Instructions and Service Manual", Rev. C, Oct. 2010, 8 pages.
Gaymar Industries Inc., "Sof Care Bed Cushions Instructions for Use", Sep. 1993, 2 pages.
Gaymar Industries Inc., "Sof Matt Low Air Loss Mattress System Operator's Manual/Service Manual", Oct. 2010, 40 pages.
Gaymar Industries Inc., "Symmetric Aire Mattress Ref SYM3000 Series Instructions for Use", Apr. 2012, 3 pages.
Gaymar Industries, "Symmetric Aire Mattress Ref SYM3000 Series Service Document", Rev. A, Jun. 2010, 2 pages.
Plexus Medical, "O2 Zoned C4000 Portable Rotation System; CareMedx C5000 Multi-Zoned Low Air Loss Therapy System Service Manual", published at least prior to Sep. 2018, 58 pages.
Plexus Medical, "Plexus C1000D Series Control Unit Service Manual", published at least prior to Sep. 2018, 20 pages.
Plexus Medical, "Plexus P1500 Air Express LAL System Service Manual", published at least prior to Sep. 2018, 17 pages.
Sage Products, "Pressure Injury and Safe Patient Handling Solutions—Prevalon Mobile Air Transfer Systems; Prevalon Turn & Position Systems; Prevalon Heel Protectors; Prevalon Seated Positioning System Brochure", 2017, 20 pages.
Sage Products, "Prevalon Air Pump Brochure", 2017, 1 page.
Sage Products, "Prevalon AirTap Patient Repositioning System Operator's Manual", 2016, 10 pages.
Sage Products, "Prevalon AirTap XXL Patient Repositioning System Brochure", 2018, 4 pages.
Sage Products, "Prevalon Standard Turn and Position System Instructions for Use", 2016, 1 page.
Sage Products, "Prevalon Turn and Position System 2.0 Instructions for Use", 2016, 1 page.
Sage Products, "Sage Product Catalog—Pressure Injury Prevention and Safe Patient Handling", 2018, 4 pages.
Stryker Medical, "Arise 1000 EX Low Air-Loss Bariatric Surface Specification Sheet", Rev. B, 2008, 2 pages.
Stryker Medical, "Arise 1000EX Low Air Loss Therapy Mattress Model 2236 Operations/Maintenance Manual", Rev. B, May 2009, 30 pages.
Stryker Medical, "ComfortGel SE Support Surface Ref 1805 Operations Manual", Rev. C, Sep. 2016, 18 pages.
Stryker Medical, "ComfortGel Support Surface Ref 2850 Operations Manual", Rev. A, Aug. 2017, 22 pages.
Stryker Medical, "ComfortGel Support Surface Specification Sheet", Rev. E.6, Dec. 2011, 2 pages.
Stryker Medical, "EOLE / EOLE DC Pump Ref 2870, Ref 2871 Service Manual", Oct. 2017, 16 pages.
Stryker Medical, "EOLE DC Powered Support Surface Ref 2871 Operations/Maintenance Manual", Dec. 2017, 288 pages.
Stryker Medical, "EOLE Powered Support Surface Ref 2870 Operations/Maintenance Manual", Dec. 2017, 288 pages.
Stryker Medical, "IsoAir Ref 2940 Service Manual", Rev. 1.0, Nov. 2016, 144 pages.
Stryker Medical, "IsoFlex LAL Support Surface Ref 2860 Operations/Maintenance Manual", Rev. C, Aug. 2017, 28 pages.
Stryker Medical, "IsoFlex LAL Support Surface Specification Sheet", Rev. D.3, 2016, 2 pages.
Stryker Medical, "ISOFLEX Pressure Management Mattress Instructions for Use", Rev. A, Jun. 2010, 2 pages.
Stryker Medical, "IsoFlex SE Support Surface Ref 1806 Operations Manual", Rev. C, Sep. 2016, 20 pages.
Stryker Medical, "IsoGel AIR Support Surface Ref 2860 Operations Manual", Rev. F, May 2015, 25 pages.
Stryker Medical, "IsoGel Support Surface Dimensional Gel Technology Specification Sheet", Dec. 2013, 2 pages.
Stryker Medical, "Isolibrium Support Surface Ref 2971 Operations/Maintenance Manual", Rev. B, Oct. 2014, 202 pages.
Stryker Medical, "Isolibrium Support Surface Ref 2971 Operations/Maintenance Manual", Rev. C, May 2014, 200 pages.

* cited by examiner

PATIENT SUPPORT

CROSS-REFERENCE TO RELATED APPLICATIONS

The subject patent application is a Continuation of U.S. patent application Ser. No. 16/585,641 filed on Sep. 27, 2019, which claims priority to and all the benefits of U.S. Provisional Patent Application No. 62/738,158 filed on Sep. 28, 2018, the disclosures of each of which are hereby incorporated by reference in their entirety.

BACKGROUND

Prolonged bed rest without adequate mobilization supports (e.g., mattresses) are designed to reduce the presence of moisture below the patient, which reduces the likelihood of compromising the patient skin and thereby the developing pressure sores/ulcers/injuries. Patient supports designed to reduce the presence of moisture below the patient may include an internal air supply system that carries away moisture vapor entering the patient support through a cover. Ideally, the airflow within the patient support should not become obstructed when pressure is supplied to the patient support (e.g. through the weight of the patient). However, the airflow in typical patient supports becomes obstructed when the cover is pressed against a relatively dense support layer.

A patient support designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
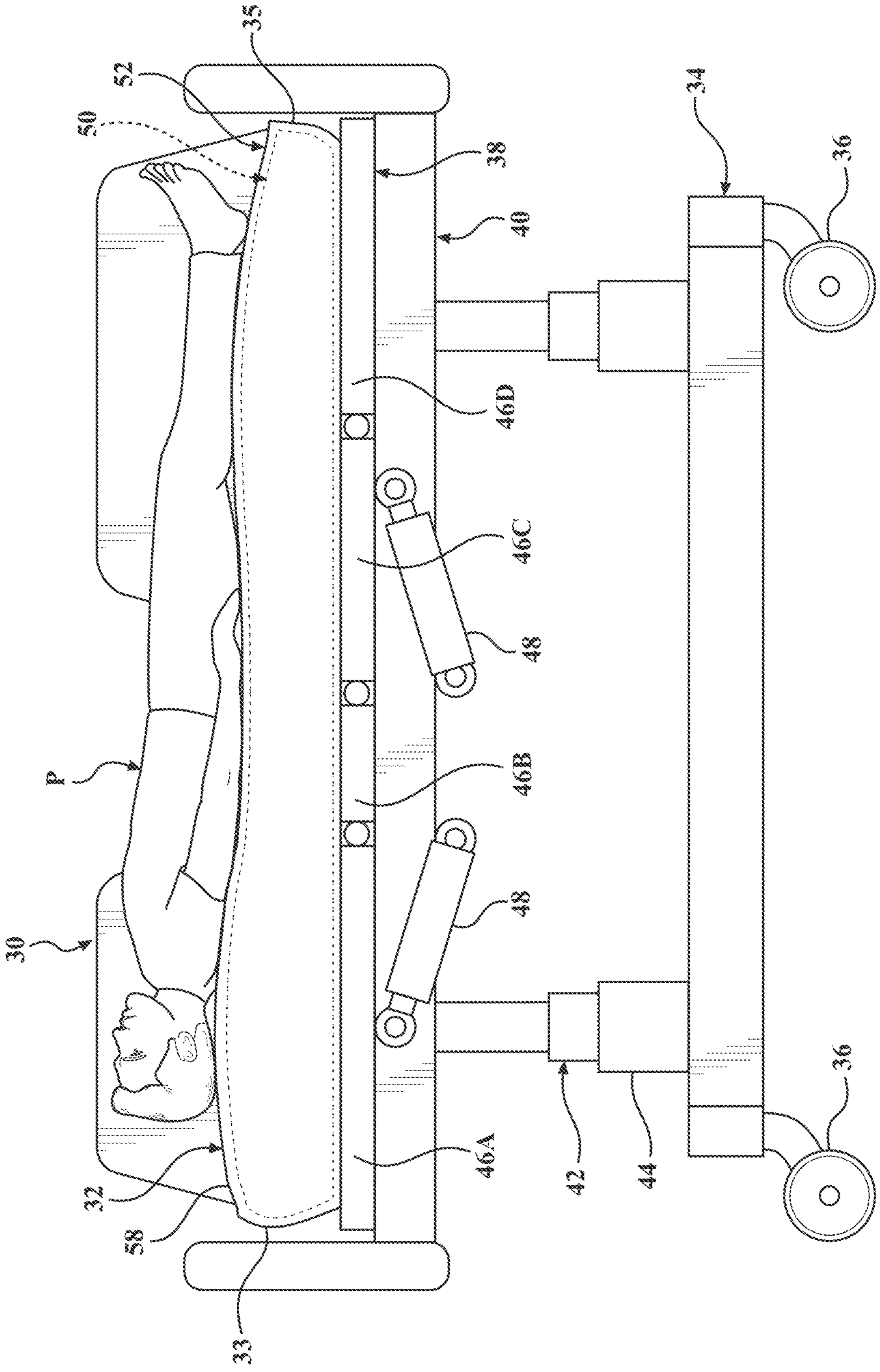
FIG. 1 is an elevational view of a patient support apparatus including a patient support.

FIG. 1 illustrates a patient support apparatus 30 including a patient support 32 in accordance with an exemplary embodiment of the present disclosure. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34. The illustrated embodiment shows the wheels 36 as casters configured to rotate and swivel relative to the base 34 during transport with each of the wheels 36 disposed at or near an end of the base 34. In some embodiments, the wheels 36 may be non-steerable, steerable, non-powered, powered, or combinations thereof. For example, the patient support apparatus 30 may comprise four non-powered, non-steerable wheels, along with one or more additional powered wheels. The present disclosure also contemplates that the patient support apparatus 30 may not include wheels.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including articulating sections 46 configured to articulate the patient support 32 between various configurations. The articulating sections 46 may include a fowler section 46A, a seat section 46B, a thigh section 46C, a leg section 46D, and the like, operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 to be described in detail, and in certain embodiments a cover assembly 52 within which the crib assembly 50 is disposed.

Figure 2:
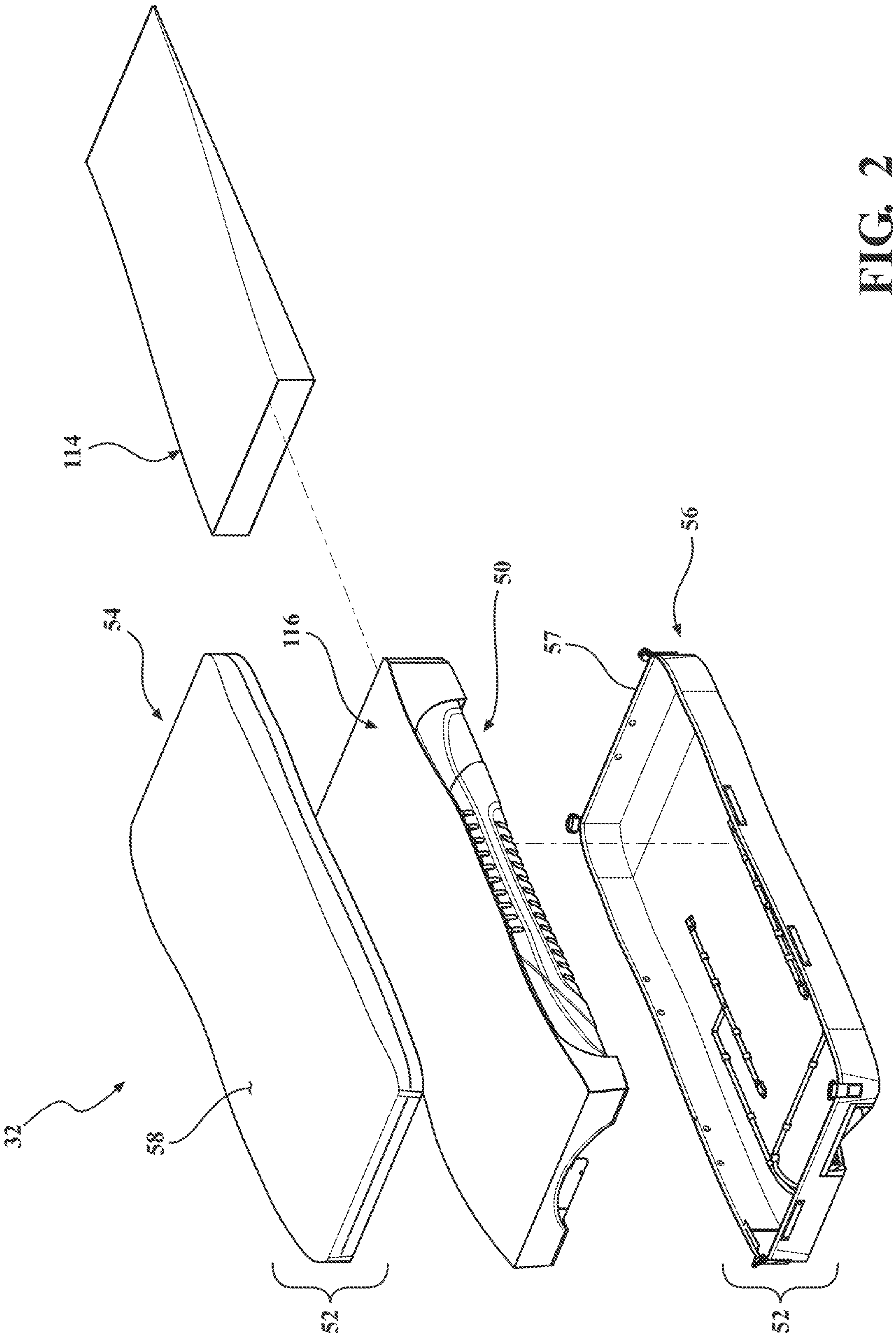
FIG. 2 is an exploded view illustrating a crib assembly, spacer layer, and a cover assembly.

Referring to FIG. 2, the cover assembly 52 may include a top cover assembly 54 opposite a bottom cover assembly 56 that cooperate to define an interior sized to receive the crib assembly 50. In certain embodiments, the top cover assembly 54 and the bottom cover assembly 56 are air impermeable. In other words, the top and bottom cover assemblies 54, 56 are formed of a material configured to inhibit the flow of air through the top and bottom cover assemblies 54, 56. In addition, in certain embodiments, the top cover assembly 54 and the bottom cover assembly 56 are vapor permeable. Meaning the top and bottom cover assemblies 54, 56 are formed of a material configure to allow vapor (e.g. moisture vapor resulting from the body heat and sweat of a patient) to pass through the top and bottom cover assemblies 54, 56. The practical implication of the top and bottom cover 54, 56 being air impermeable and vapor permeable is that the top and bottom cover 54, 56 will not allow air circulating within the cover assembly 52 to pass directly through the top and bottom cover 54, 56, but will allow moisture vapor from outside the top and bottom cover 54, 56 to reach the crib assembly 50 through the cover assembly 52. This configuration may result in the moisture vapor entering the cover assembly 52 to be carried by air contained and circulating within the cover assembly 52. In some versions, the bottom cover assembly 56 may be air impermeable and vapor impermeable.

Figure 3:
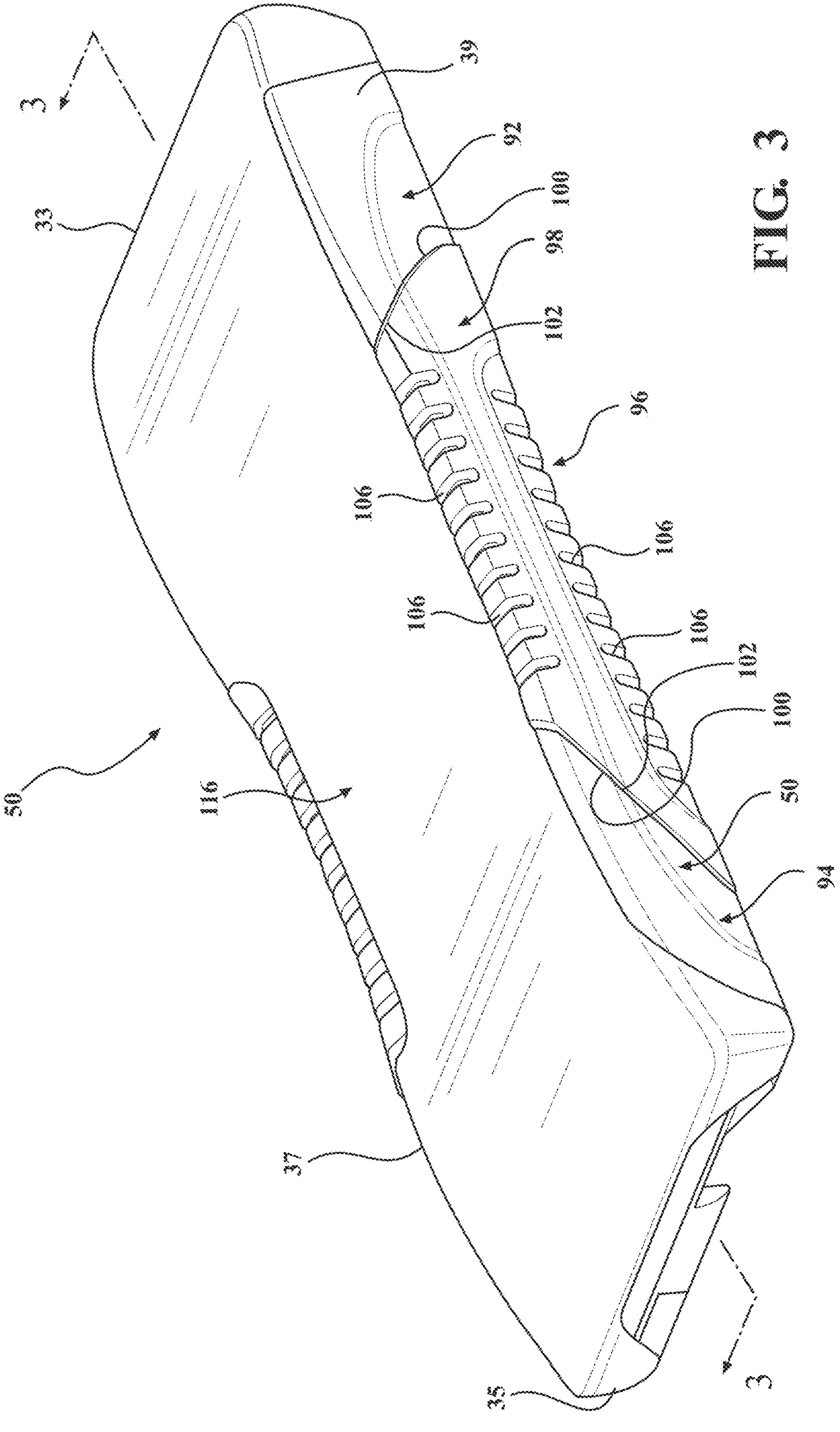
FIG. 3 is a perspective view of the crib assembly and the spacer layer.

In certain embodiments, the cover assembly 52 may include a breathable structure 57 (see also FIG. 6) configured to allow fluid dispersed by the spacer layer 116 to exit the patient support 32. In certain embodiments, the breathable structure 57 may be a vapor and/or air permeable material coupled to the top cover assembly 54 or bottom cover assembly 56. In other embodiments, the breathable structure 57 may be a void defined by the top cover assembly 54, bottom cover assembly 56, or a combination thereof. Still further, in the embodiment illustrated in FIG. 6, the breathable structure is further defined as a fastening device 57 which is further configured for coupling the top cover assembly 54 and the bottom cover assembly 56. In one example, the fastening device 57 is a zipper extending about sides of the cover assembly 52. Of course, when the cover assembly 52 includes fastening device 57, such as a zipper, the entire cover assembly 52 may not be air impermeable (i.e., air may pass through the cover assembly 52 via the fastening device 57). In fact, the zipper or other fastening device 57 may be arranged and designed to act as an outlet for air. Other fastening devices may include snaps, clips, tethers, hook and eye connections, adhesive, and the like. In one variant, the top cover assembly 54 and the bottom cover assembly 56 are integrally formed to provide the cover assembly 52 of unitary structure that is not removable from the crib assembly 50. A watershed (not shown) may be coupled to the top cover assembly 54 and/or the bottom cover assembly 56 near the fastening device 57 to prevent ingress of fluid and other substances through the fastening device 57 to within the patient support 32. The crib assembly 50 disposed within the cover assembly 52 may be substantially encased within the cover assembly 52 to define the patient support 32. The crib assembly 50 includes a head end 33 opposite a foot end 35 separated by opposing sides 37, 39 (see FIG. 3).

The patient support 32 defines a patient support surface 58 (FIG. 2) for supporting the patient P. Absent bedding and the like, the patient P may be considered in direct contact with the patient support surface 58 when situated on the patient support 32. Referring now to FIGS. 1 and 2, the patient support surface 58 may be considered an upper surface of the top cover assembly 54 of the cover assembly 52. The patient support surface 58 is sized to support at least a majority of the patient P. Furthermore, during movement therapy to be described, the patient support surface 58 is moved relative to other structures of the patient support 32 and the patient support apparatus 30.

Certain aspects of the crib assembly 50 will now be described with reference to FIGS. 4 and 5. The crib assembly 50, in a most general sense, provides the internal structure of the patient support 32 for supporting and cushioning the patient P on the patient support surface 58. The crib assembly 50 includes at least one, and in the illustrated embodiment more than one, conformable layers to resiliently deform when supporting the weight of the patient P. FIG. 5 shows the crib assembly 50 including an upper conformable layer 60 and a lower conformable layer 62. The upper conformable layer 60 may include a first section 64, a second section 65, and a third section 66 positioned along a length of the crib assembly 50 from the head end 33 to the foot end 35. The first, second, and third sections 64-66 may be arranged (e.g., positioned adjacent to one another) such that the upper conformable layer 60 is disposed beneath at least a majority of the patient support surface 58. In other words, the first section 64 may be disposed near the head end 33 and configured to support at least a portion of the upper body of the patient P, the third section 66 may be disposed near the foot end 35 and positioned to support at least a portion of the lower body of the patient P, and the second section 65 may be disposed between the first and third sections 64, 66 and positioned to support at least a portion of the upper and/or lower body of the patient P. More specifically, the second section 65 may be positioned to support the sacrum, buttocks, and thighs of the patient P, and includes features to be described that accommodate the increased focal pressures often experienced by the patient P in these anatomical areas.

In certain embodiments, the first, second, and/or third sections 64-66 of the upper conformable layer 60 may each include a lattice 68 of cells 70 with at least a portion of the cells 70 including a vertically oriented fluid passage 71 (FIG. 7) configured to permit a fluid (e.g. air) to pass through the cells 70. The lattices 68 of cells 70 may be integrally formed or separately formed lattices 68 that are connected together. Each lattice 68 of cells 70 may be formed of elastic materials, visco-elastic materials, and/or other suitable materials. FIG. 5 shows the first, second, and third sections 64-66 including a head lattice, a torso lattice, and a foot lattice, respectively, with the lattices 68 of an adjacent two of the first, second, and third sections 64-66 positioned in an interlocking arrangement (e.g., a hexagonal tessellation). In other words, the cells 70 at one end of the head lattice 68 are staggered to provide a zig-zag end, and the cells 70 at a complementary end of the torso lattice 68 are staggered to provide a complementary zig-zag end. Likewise, the cells 70 at the other end of the torso lattice 68 are staggered to provide a zig-zag end, and the cells 70 at a complementary end of the foot lattice 68 are staggered to provide a complementary zig-zag end. The complementary zig-zags are positioned in abutting relationship to provide the interlocking arrangement such that, when assembled, the lattices 68 of the first, second, and third sections 64-66 appear integrally formed or continuous.

Figure 4:
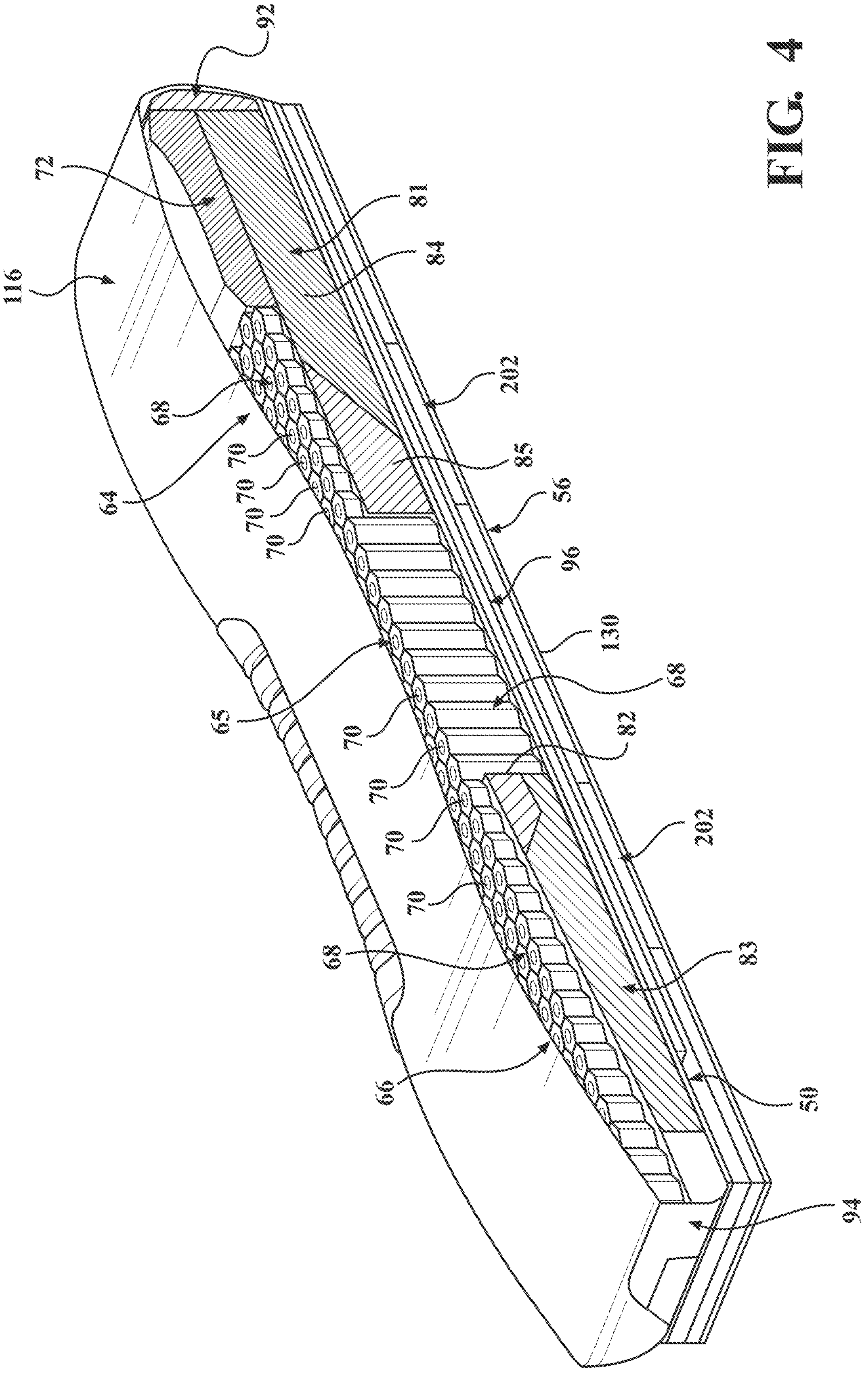
FIG. 4 is a cross-sectional view of the crib assembly and the spacer layer.
Figure 5:
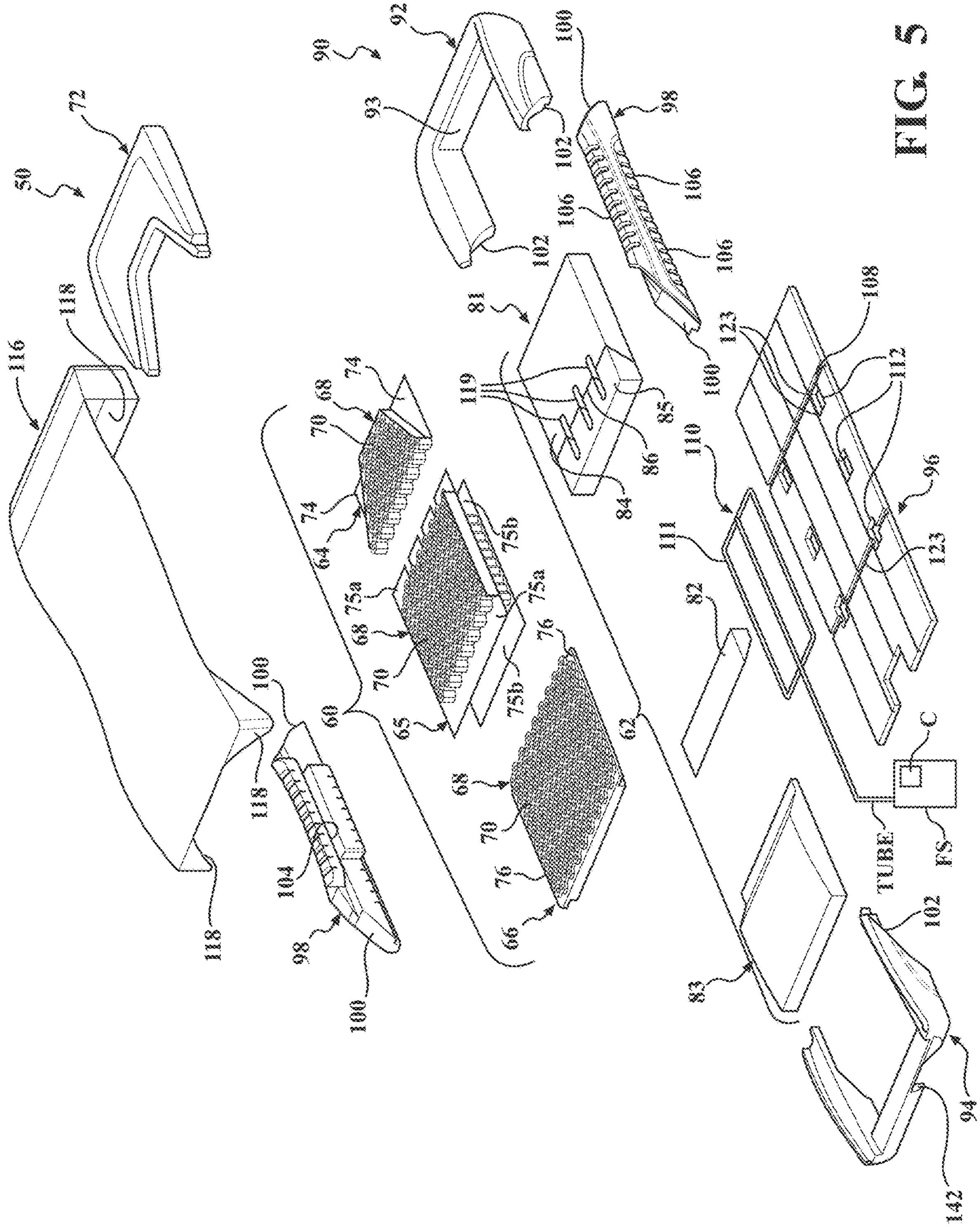
FIG. 5 is an exploded view of the crib assembly and the spacer layer.

With continued reference to FIGS. 4 and 5, the lattice 68 of the first section 64 may include a taper such that the lattice 68 appears generally trapezoidal in shape when viewed in plan. The taper is shaped to accommodate a head end support 72 of the crib assembly 50. In particular, the head end support 72 may be generally U-shaped in construction with opposing legs of the head end support 72 being shaped complementarily to the taper of the lattice 68 of the first section 64. The first section 64 may include coupling features 74 (described further below) extending outwardly from the legs of the trapezoidal-shaped lattice 68 such that the first section 64 appears rectangular when viewed in plan. The coupling features 74 are configured to be coupled with an underside of the legs of the head end support 72 by a suitable joining means, for example an adhesive. A thickness of an end of the head end support 72 adjacent the first section 64 may be approximate a thickness of the lattice 68 of the first section 64 such that, when the head end support 72 and the first section 64 are coupled together, a contoured surface is provided. It is understood from FIGS. 4 and 5 that the head end support 72 may be further contoured in a manner to support the head of the patient P. In certain embodiments, the head end support 72 may be formed from material(s) with less conformability relative to that of the lattice 68 of the first section 64 to accommodate the distinct considerations of supporting the head of the patient P on the patient support 32.

The second section 65 of the upper conformable layer 60 may include the lattice 68 that is generally rectangular in shape when viewed in plan. The second section 65 may include coupling features 75*a*, 75*b* extending outwardly from the rectangular-shaped lattice 68. The coupling features include upper coupling features 75*a*, and lower coupling features 75*b* to be described. The upper coupling features 75*a* on one end of the second section 65 are configured to be coupled with an underside of the first section 64 by a suitable joining means, for example an adhesive, when the head lattice and the torso lattice are positioned in the interlocking arrangement previously described. Likewise, upper coupling features 75*a* on the other end of the second section 65 are configured to be coupled with an underside of the third section 66 with a suitable joining means, for example an adhesive, when the torso lattice and the foot lattice are positioned in the interlocking arrangement previously described. As best shown in FIG. 4, a thickness of the lattice 68 of the second section 65 may be greater than each of the lattices 68 of the first and third sections 64, 66. The increased thickness of the torso lattice, among other advantages, accommodates the increased focal pressures often experienced by the patient P in the anatomical areas mentioned.

The lower conformable layer 62 may include a first section 81, a second section 82, and a third section 83. The first, second, and/or third sections 81-83 of the lower conformable layer 62 may be formed from foam-based material(s) and/or other suitable material(s). The material(s) comprising the first, second, and/or third sections 81-83 may be less conformable relative to that of the lattices 68 of the first, second, and/or third sections 64-66, as it is appreciated that cushioning demands of the lower conformable layer 62 may be relatively less than that of the upper conformable layer 60. The first section 81 may be at least partially positioned beneath at least one of the head end support 72 and the first section 64 of the upper conformable layer 60. In other words, an underside of the head end support 72 and/or the first section 64 is supported upon an upper surface of the first section 81. The first section 81 may include a first portion 84 and a second portion 85 coupled to one another at a joint 86.

As mentioned, the thickness of the lattice 68 of the second section 65 may be greater than the thickness of each of the lattices 68 of the first and third sections 64, 66. With continued reference to FIGS. 4 and 5, an end of the first section 81 of the lower conformable layer 62 may be positioned adjacent a corresponding end of the second section 65 of the upper conformable layer 60. In certain locations of the second section 65, there may not be a structure of the lower conformable layer 62 positioned beneath the second section 65 of the upper conformable layer 60. The second section 82 of the lower conformable layer 62 is positioned adjacent another end of the second section 65 of the upper conformable layer 60 opposite the first section 81, as best shown in FIG. 4. The second section 82 of the lower conformable layer 62 may further be at least partially positioned beneath the third section 66 of the upper conformable layer 60. In other words, an underside of the third section 66 is supported on an upper surface of the second section 82.

The third section 83 of the lower conformable layer 62 may be positioned adjacent the second section 82. The third section 83 may be at least partially positioned beneath at least one of the second and third sections 65, 66 of the upper conformable layer 62. In other words, an underside of the second section 65 and/or the third section 66 of the upper conformable layer 62 is supported upon an upper surface of the third section 83 of the lower conformable layer 62. With continued reference to FIGS. 4 and 5, each of the second and third sections 82, 83 of the lower conformable layer 62 may include complementarily inclined surfaces positioned in an abutting relationship.

As mentioned, the coupling features of the second section 65 may include the upper coupling features 75*a* previously described, and lower coupling features 75*b*. The lower coupling features 75*b* extend outwardly from the rectangular-shaped lattice 68 and are spaced apart from the upper coupling features 75*a* to define gaps therebetween. The lower coupling features 75*b* on one end of the second section 65 are configured to be coupled with an underside of the first section 81 by a suitable joining means, for example an adhesive, and the lower coupling features 75*b* on the other end of the second section 65 are configured to be coupled with an underside of the third section 83 by a suitable joining means, for example an adhesive. In such an arrangement, the gaps between the upper and lower coupling features 75*a*, 75*b* are sized to receive a thickness of the first section 81 and a combined thickness of the second and third sections 82, 83, as best shown in FIG. 4.

The upper conformable layer 60 and the lower conformable layer 62 are configured to be received in a cavity defined by a crib 90 of the crib assembly 50. In a most general sense, the crib 90 provides a framework of the patient support 32. In the illustrated embodiment, the crib 90 may include a head end frame member 92, a foot end frame member 94, a base layer 96, and side frame members 98 with each to be described in turn. The head end frame member 92 may be generally U-shaped in construction with the head end frame member 92 engaging the first section 81 of the lower conformable layer 62 on three sides. The head end frame member 92 may include a recess 93 sized to receive an end of the first section 81. Further, the generally U-shaped head end frame member 92 may at least partially engage the head end support 72 on three sides. In at least some respects, the head end frame member 92 may be considered the head end 33 of the crib assembly 50.

The foot end frame member 94 may be coupled to the upper and lower conformable layers 60, 62 opposite the head end frame member 92. The foot end frame member 94 may be coupled to an end of the third section 66 opposite the second section 65. FIG. 5 shows the foot end frame member 94 being generally U-shaped in construction so that the foot end frame member 94 engages the third section 66 on three sides. In particular, the third section 66 of the upper conformable layer 60 includes coupling features 76 extending from opposing sides of the lattice 68. The coupling features 76 are configured to be coupled with an upper surface of opposing legs of the generally U-shaped foot end frame member 94 by a suitable joining means, for example an adhesive. In at least some respects, the foot end frame member 94 may be considered the foot end 35 of the patient support 32.

Flanking the upper and lower conformable layers 60, 62 are the side frame members 98. The side frame members 98 are coupled to each of the head end frame member 92 and the foot end frame member 94. With concurrent reference to FIG. 3, the illustrated embodiment shows the side frame members 98 including inclined surfaces 100 matingly engaging complementary inclined surfaces 102 of each of the head end frame member 92 and the foot end frame member 94. Further, the side frame members 98 may be coupled to one or both of the upper and lower conformable layers 60, 62. FIG. 5 shows the side frame members 98 including an upper ledge 104 configured to receive the upper coupling features 75*a* extending from opposing sides of the second section 65 with a suitable joining means, for example an adhesive.

Referring to FIG. 5, the side frame members 98 may include slots 106 at least partially extending transversely through the side frame members 98 to define rib-like structures. The slots 106 may be provide for flexion of the side frame members 98 through relative articulation of the rib-like structures secondary to the material forming the side frame members 98. The slots 106 may further include upper and lower slots extending inwardly from upper and lower surfaces, respectively, of the side frame members 98.

The side frame members 98 coupled to each of the head end frame member 92 and the foot end frame member 94 may be considered to define a perimeter of the crib 90. The aforementioned cavity within which the upper and lower conformable layers 60, 62 are received is further defined by the base layer 96. Referring again to FIG. 5, the base layer 96 may be a planar structure to which each of the head end frame member 92, the foot end frame member 94, and the side frame members 98 are coupled. The base layer 96 is positioned beneath the lower conformable layer 62 such that an upper surface the base layer 96 may support the lower conformable layer 62. The base layer 96 may include at least one channel 108 sized to receive a low air loss manifold 110. The low air loss manifold 110 is configured to be in communication with a fluid source FS (see FIG. 5) to at least partially define a fluid flow path and circulate fluid from the fluid source FS, for example, air or conditioned fluid, through the fluid flow path to supply heat, remove heat, supply moisture, remove moisture, or the like, from the patient support surface 58. Typically, the low air loss manifold 110 is configured to remove moisture (or moisture vapor). In other words, the low air loss manifold 110 circulating fluid may be utilized to control the conditions at or near an interface between the top cover assembly 54 and the skin of the patient, to control the temperature and/or humidity at the interface. The fluid source FS may comprise a pump, fan, or other device capable of supplying fluid, such as air, to the low air loss manifold 110 through external tubing TUBE. One or more external tubes, valves, connectors, fittings, or the like, as desired, may be positioning between the fluid source FS and the low air loss manifold 110 to control the flow of fluid into the low air loss manifold 110. Additionally, the fluid source FS may comprise a controller C to control operation of the fluid source FS (e.g., the pump, fan, or other device).

The low air loss manifold 110 may be of any structure suitable for communicating with the fluid source FS and partially defining the fluid flow path. For example, in the illustrated embodiment shown in FIG. 5, the low air loss manifold 110 includes tubular conduit 111 for communicating with the fluid source FS via the external tubing TUBE and partially defining the fluid flow path. When the low air loss manifold 110 includes tubular conduit 111, as shown in FIG. 5, the base layer 96 may also define grooves 123 configured to receive the tubular conduit 111. As also shown in FIG. 5, the base layer 96 may also include apertures 112 to accommodate structures of a patient turning system. In certain embodiments, the crib assembly 50 includes a fire barrier layer 114 (see FIG. 2). Exemplary fire barrier layers suitable for the present application may be provided under the tradename NoMex (DuPont Company, Wilmington, Dela.), and under the tradename Integrity30 (Ventrex Inc., Ashburn, Virg.).

Figure 9:
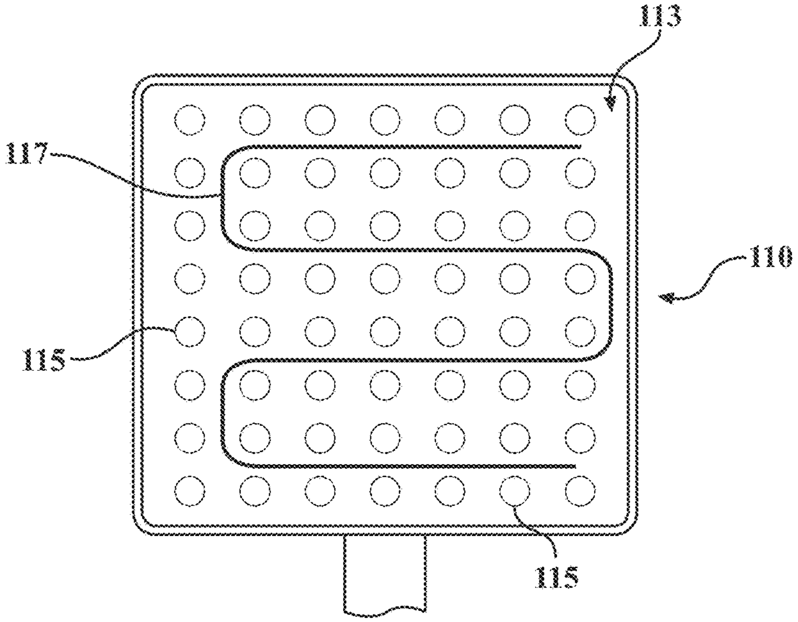
FIG. 9 is an embodiment of a low air loss manifold.

In alternative embodiments, as shown in FIG. 9, the low air loss manifold 110 may include a punctured bladder 113. The punctured bladder 113 typically includes a top and bottom layer with the layers connected about their respective edges. For example, the top and bottom layers may be joined by welding the edges of each layer together. In certain embodiments, a thermoforming process may be suitable for forming the punctured bladder 113 without the need for welding. The punctured bladder 113 may also include a plurality of apertures 115 in the top layer for directing and releasing a fluid. Although the structure of the punctured bladder 113 is not particularly limited, the structure is typically sufficient to inhibit or prevent ballooning. In other words, the purpose of the punctured bladder 113 is not to provide support to the patient, but is instead to communicate with the fluid source FS and partially define the fluid flow path. To prevent ballooning, the punctured bladder 113 may include one or more welds 117 that secures or bonds the top layer to the bottom layer. As shown in FIG. 9, the weld 117 having a snake like pattern in combination with the plurality of apertures 115 may cooperate to inhibit or prevent ballooning. The punctured bladder 113 may be formed from a polymeric material and may optionally include polymeric fibers. When the low air loss manifold 110 includes the punctured bladder 113, the base layer 96 may optionally be omitted from the crib assembly 50, if desired. Alternatively, the base layer 96 may include a recess (not shown) to receive the punctured bladder 113. Alternatively, the punctured bladder 113 may rest upon on the base layer 96 without the base layer specifically including a recess to receive the punctured bladder 113.

The patient support 32 may include a spacer layer 116 covering substantially an entirety of an upper surface of the crib assembly 50. More particularly, the spacer layer 116 covers the head end support 72 and the upper conformable layer 60. As best shown in FIG. 5, the spacer layer 116 may include coupling features 118 with the coupling features 118 at one end sized to receive the crib assembly 50, and more particularly the head end frame member 92. The coupling features 118 at the opposing end are configured to be coupled to the foot end frame member 94. The coupling features may be gusset-like features, such as elastic gussets conventionally provided on fitted sheets. In an alternative embodiment (not shown), the spacer layer 116, instead of including the coupling features 118, is bonded directly to the underside of the top cover assembly 54 of the cover assembly 52. For example, an adhesive may be used to bond the spacer layer 116 to the underside of the top cover assembly 54. Alternatively, the spacer layer 116 can be made integral with the top cover assembly 54. For example, the spacer layer 116 may be coated with a polymeric material (e.g. a polyurethane) and made integral with the top cover assembly 54, such that the coated spacer layer 116 is not separable from the top cover assembly 54.

Figure 10A:
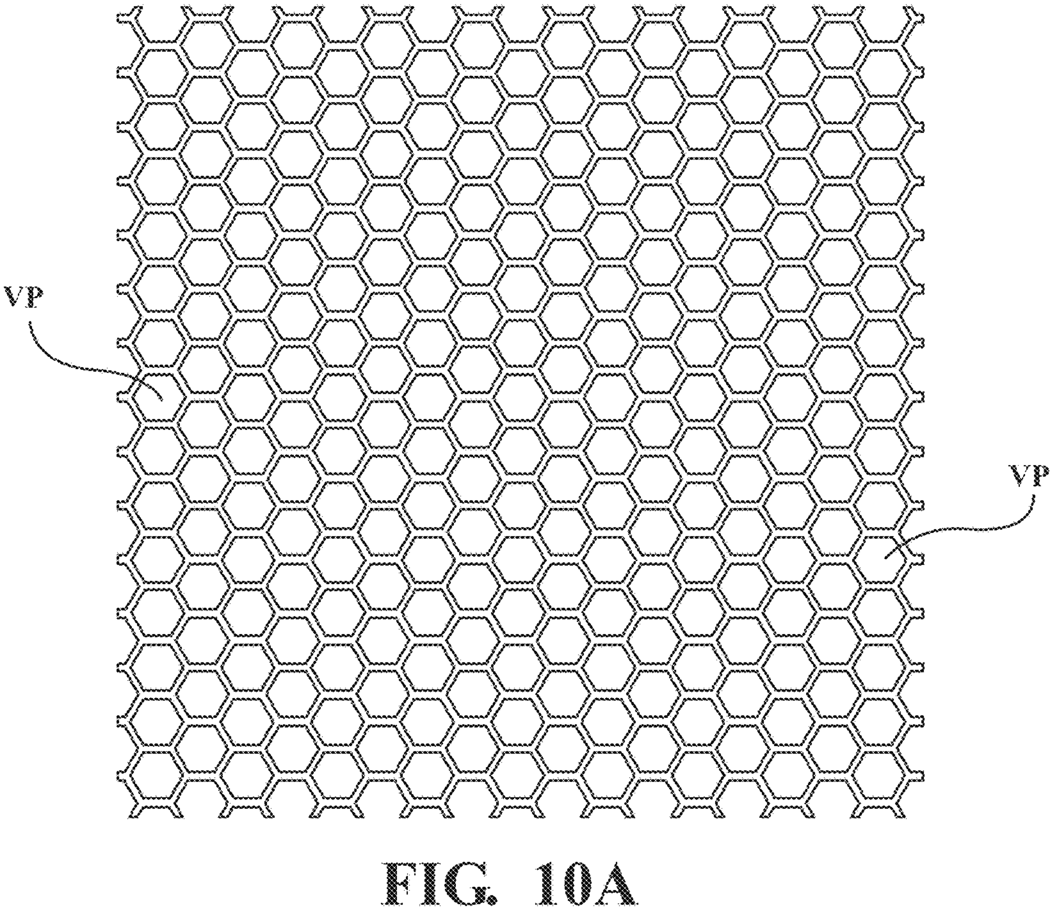
FIG. 10A is a top view of a suitable spacer layer.
Figure 10B:
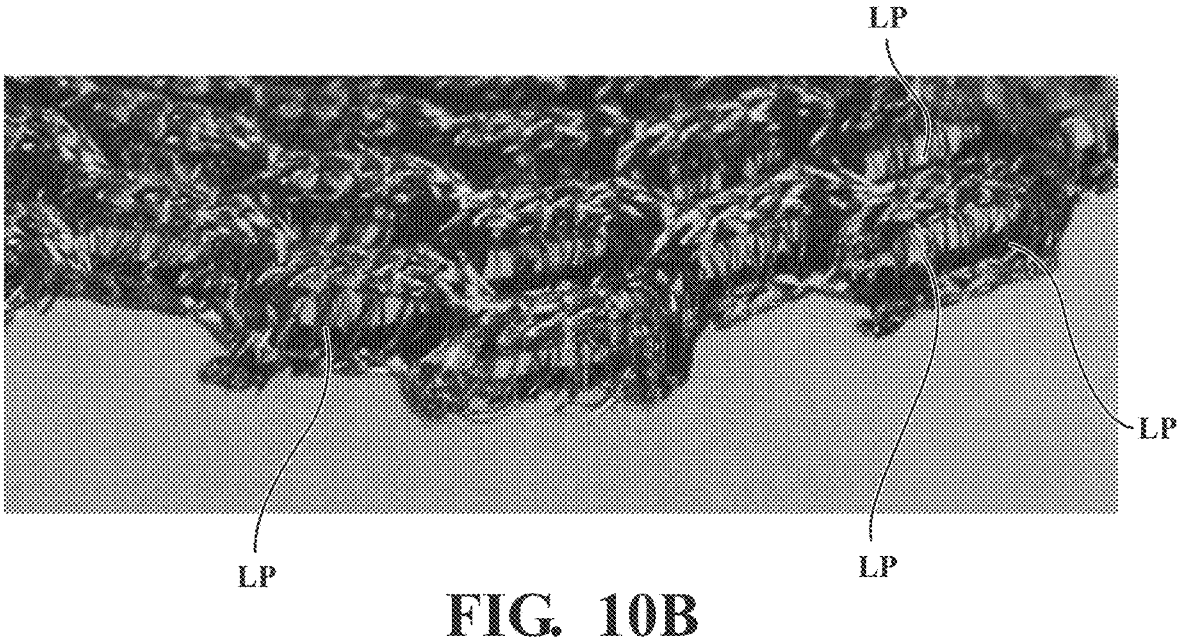
FIG. 10B is a side perspective view of the spacer layer of FIG. 10A.

As best shown in FIGS. 10*a* and 10*b*, the spacer layer 116 may be further defined as a porous material of 3-dimensional woven fabric that allows fluid flow to pass vertically and laterally through the spacer layer 116. In the embodiment illustrated collectively in FIGS. 10*a* and 10*b*, the spacer layer 116 includes a top surface, a bottom surface, and a vertically oriented fibers extending from the bottom surface to the top surface. Referring first to the top surface, the top surface may be formed from the woven fabric and define a first plurality of pores. Similarly, the bottom surface may also be formed from the woven fabric and a second plurality of pores. The bottom surface may appear substantially the same as the top surface. In other words, the pore size, density, and geometry of the top surface may be the same as the bottom surface. Of course, the pores size, density, geometry, and general spacing of the pores of top and bottom surfaces may also be different. The pore size, density, geometry, and general spacing of the top and bottom layers may be selected to achieve a desired fluid flow.

As best shown in FIG. 10B, the vertically oriented fabric strands connect the bottom surface to the top surface, to form the 3-dimensional spacer layer 116. In addition, as also shown in FIG. 10B, the vertically oriented fabric strands form lateral passages through the spacer layer 116. Because the top surface and the bottom surface are coupled via the vertically oriented fabric strands, the top and bottom surface are not rigidly fixed together. For example, the top surface and the bottom surface may be capable of shearing in opposing directions with the magnitude of the associated displacement limited by a height of the vertically oriented fabric strands and the stretch (if any) of the woven fabric. Similarly, because the top and bottom surfaces are coupled via the vertically oriented fabric strands, the top and bottom surfaces are generally able to be forced towards one another (i.e., compressed together). However, even when the top and bottom surfaces are forced towards one another, a fluid (e.g. air) is still capable of passing through the pores of the spacer layer 116 in the vertical direction, lateral direction, or both.

The spacer layer 116 may also be made from any suitable material. As described above, typically the material is woven fabric. In one embodiment, the spacer layer 116 is made of woven polyester and has a weight of from 8 to 14 oz/yd$^2$. Alternatively, the weight may be from 8 to 13, from 8 to 12, from 9 to 14, from 9 to 13, from 9 to 12, from 9 to 13, from 10 to 13, or about 12, oz/yd$^2$. The height of the spacer layer 116 may also be from 0.8 to 0.15 inches. Alternatively, the height may be from 0.12 to 0.14 inches. Suitable spacer layers are commercially available from Apex Mills of Inwood, N.Y.

As previously mentioned, the top cover assembly 54 is coupled to the bottom cover assembly 56, for example, with the fastening device 57. Components and features of the bottom cover assembly 56 will now be described with reference to FIG. 6. The bottom cover assembly 56 includes a carrier sheet 120. An upper surface of the carrier sheet 120 may be considered the structure in direct contact with an underside of the base layer 96 when the patient support 32 is assembled. At least one coupler 122 may be coupled to and extend from the upper surface of the carrier sheet 120. The couplers 122 are configured to secure a second conduit assembly 124 of the patient turning system 200 to be described. An underside of the base layer 96 may include additional channels (not shown) sized to receive the second conduit assembly 124 such that the underside of the base layer 96 and the upper surface of the carrier sheet 120 are in direct flat-on-flat contact. The carrier sheet 120 may include a base portion 126 and opposing sides 128 extending upwardly from the base portion 126. The fastening device 57 may be coupled to an upper edge of the opposing sides 128.

A bottom cover 130 may be coupled to the carrier sheet 120 to define a bottom of the patient support 32. In other words, an underside of the bottom cover 130 may be considered the surface in direct contact with the patient support deck 38 of the patient support apparatus 30 (see FIG. 1). The bottom cover 130 may include a head end section 132, a middle section 134, and a foot end section 136. The head end section 132, the middle section 134, and the foot end section 136 may be integrally formed or discrete components coupled to one another. The head end, middle, and foot end sections 132-136 collectively define a cavity sized to receive the carrier sheet 120, at least one patient turning device 202 of the patient turning system 200 to be described, and at least a portion of the crib assembly 50 previously described. In particular, an upstanding sidewall of each of the head end section 132 and the foot end section 136 may be arcuate and contoured to the head end frame member 92 and the foot end frame member 94, respectively, of the crib assembly 50. In the illustrated embodiment of FIG. 6, one or more handles 138 are coupled to head end, middle, and/or foot end sections 132-136 to assist caregivers with manipulating the patient support 32 when the patient support 32 is disposed on the patient support deck 38.

The foot end section 136 defines a recess 140 sized to receive a port connector 142 to be described in detail. In short, the port connector 142 includes ports (not shown) configured to be in fluid communication with the aforementioned fluid source, and further configured to be in fluid communication with the low air loss manifold 110 and the second conduit assembly 124. The recess 140 of the foot end section 136 may be substantially aligned with a void between the gusset-like coupling features 118 coupled to the foot end frame member 94. The recess 140 of the foot end section 136 may also be substantially aligned with a complementary recess 141 defined within the foot end frame member 92, as shown in FIG. 5. The port connector 142 is positioned within the recesses 140, 141 so as to be accessible by caregivers positioned near the foot end 35 of the patient support 32.

The middle section 134 of the bottom cover 130 includes a base portion 144 and opposing sides 146 extending upwardly from the base portion 144. The fastening device 57 may be coupled to an upper edge of the opposing sides 146 (with or without also being coupled to the upper edge of the opposing sides 128 of the carrier sheet 120). With the carrier sheet 120 received within the middle section 134 of the bottom cover 130, the base portion 126 of the carrier sheet 120 is adjacent the base portion 144 of the bottom cover 130 (other than the presence of the patient turning devices 202), and the opposing sides 128 of the carrier sheet 120 are adjacent the opposing sides 146 of the bottom cover 130. The base portion 144 and/or opposing sides 146 of the bottom cover 130 may define an augmenting feature 148. In short, because the patient turning devices 202 are positioned external to the crib assembly 50 yet within the bottom cover assembly 56, the augmenting features 148 accommodate the expansion of the patient turning devices 202 and prevent "hammocking" of the patient support surface 58 during the movement therapy (i.e., localized alteration or stretching of the patient support surface 58 to a generally concave or arcuate contour that results in localized pressure points). For example, the augmenting features 148 may include the opposing sides 146 of the bottom cover 130 to be at least partially formed from Neoprene and/or other suitably elastic material(s).

Figure 6:
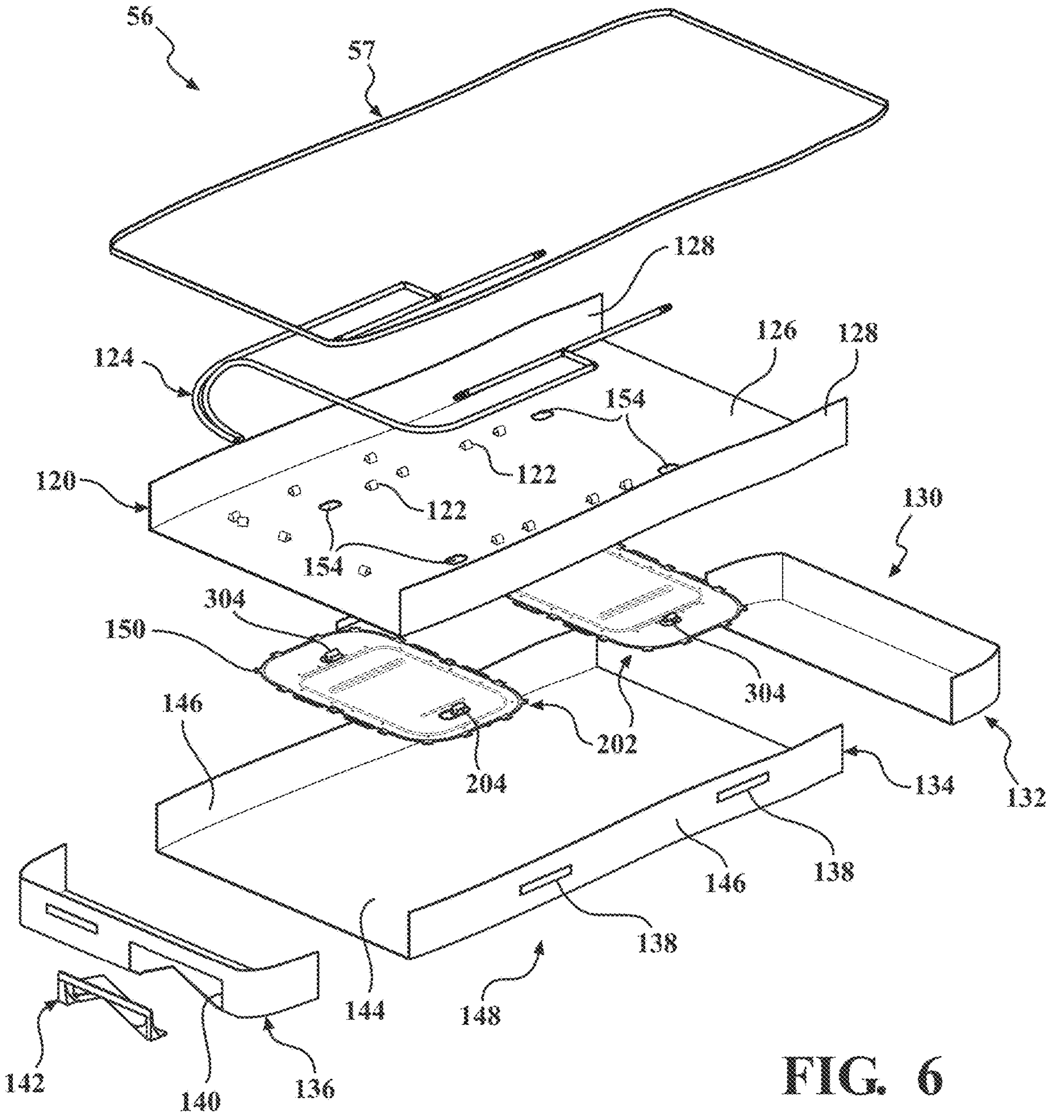
FIG. 6 is an exploded view of a bottom cover assembly.

With continued reference to FIG. 6 and concurrent reference to FIG. 4, the patient support 32 includes at least one of the patient turning devices 202 for moving the patient support surface 58, for example, during the movement therapy. The patient turning devices 202 are positioned between the carrier sheet 120 and the bottom cover 130. More particularly, the patient turning devices 202 are coupled to an underside of the carrier sheet 120 and may not be coupled to the bottom cover 130. The patient turning devices 202 include at least one inlet port 204, 206 configured to be arranged in fluid communication with the second conduit assembly 124, the ports (not shown) of the port connector 142, and the fluid source. The carrier sheet 120 includes at least one aperture 154 sized and positioned such that, when the patient turning devices 202 are coupled to the carrier sheet 120, the inlet ports 204, 206 extend through the apertures 154. In manners to be described, at least one of the patient turning devices 202 is configured to be selectively inflated and deflated in order to move at least a portion of the patient support surface 58 away from or towards the patient support deck 38, respectively.

Figure 7:
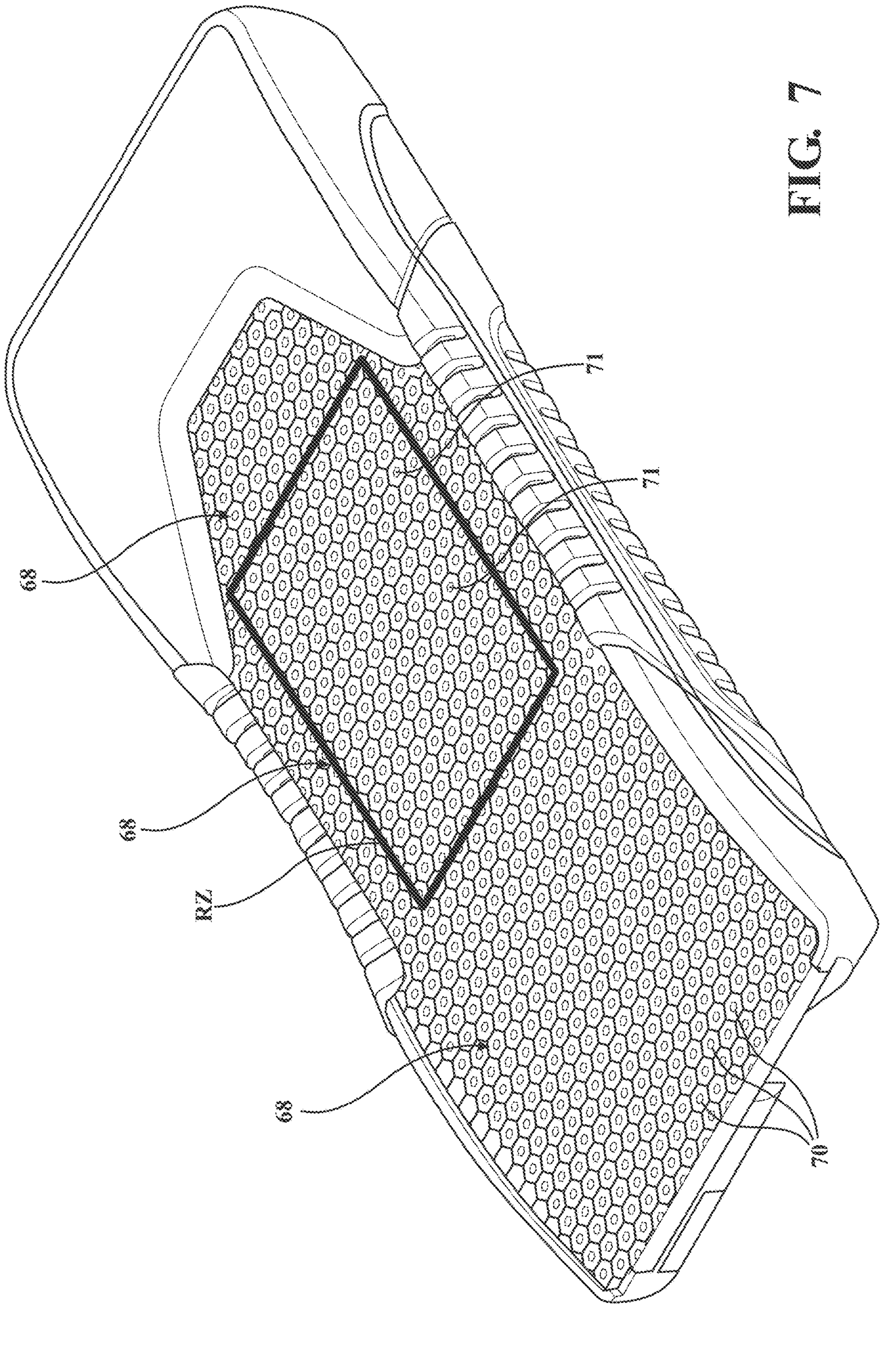
FIG. 7 is a perspective view of the crib assembly illustrating lattices of cells for supporting a patient and the surface area of a reduced zone.

Referring to FIG. 7, the crib assembly 50 is shown, including each lattice 68 of cells 70. In other versions, the crib assembly 50 may comprise one integrally formed lattice of cells, instead of separately formed lattices 68 that are connected together. In the embodiment shown, as described above, three separate lattices 68 are provided (see FIG. 5) including a head lattice, a torso lattice, and a foot lattice. One objective of the lattices 68 in the patient support design is to minimize the occurrence of pressure sores/ulcers by providing uniform pressure support for a range of patient weights. One method of achieving this objective is to use buckling elements, as is described in greater detail below.

Figure 11:
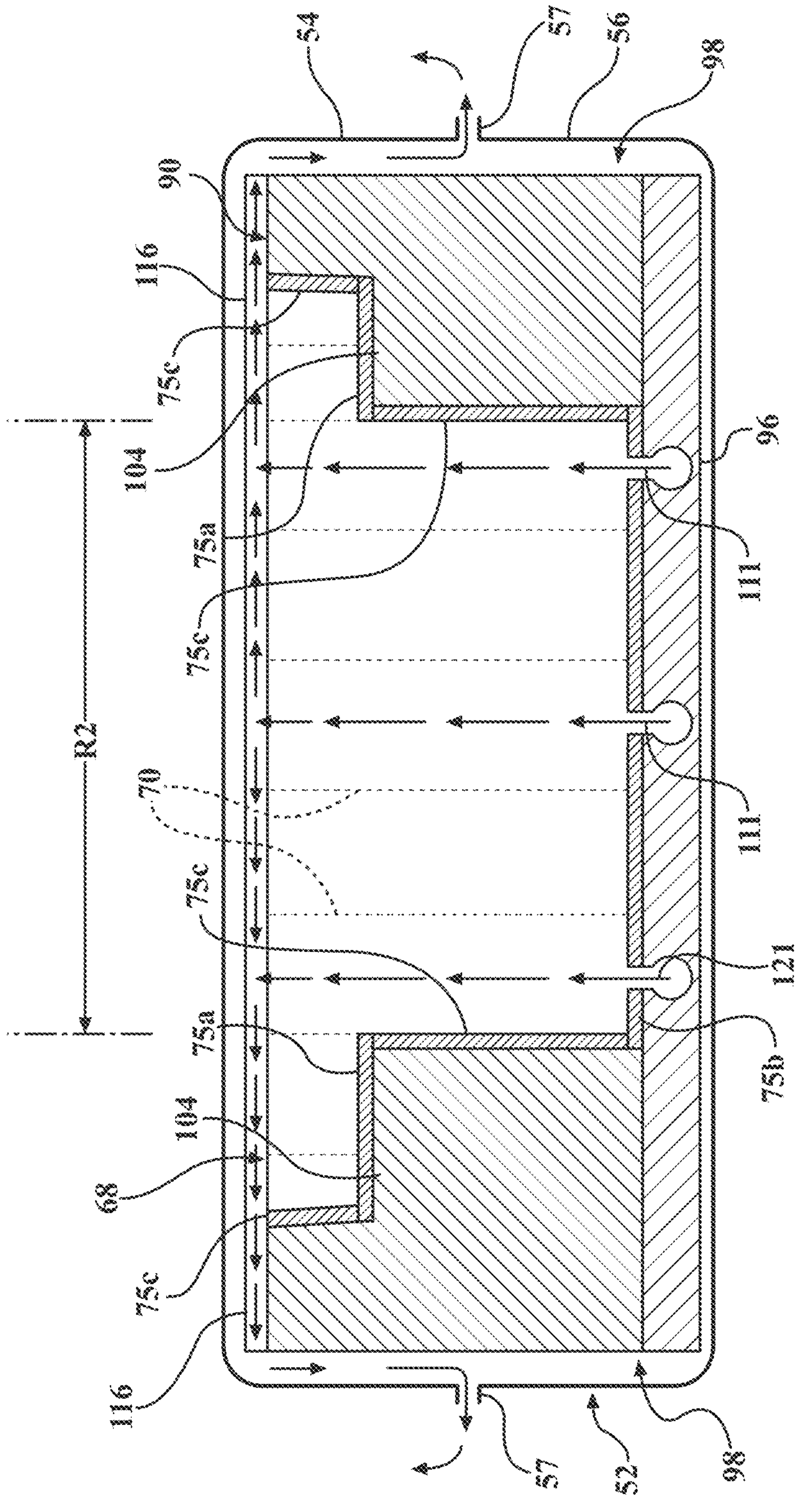
FIG. 11 is a cross-sectional view of a lattice illustrating connection of the lattice to the crib of the crib assembly.

The lattice 68 is connected to the crib 90 using coupling features 75*a*, 75*b*, 75*c*, which may comprise one or more layers. In one embodiment, coupling features 75*a*, 75*b* connect to the lattice 68 at its bottom and beneath each cantilevered section. In one embodiment, coupling features 75*c* connect to the lattice 68 on its lateral sides as well, as shown in FIG. 11. The coupling features 75*a*, 75*b*, 75*c* may comprise one or more adhesive layers, layers of connecting material such as non-woven fabric (e.g., Nylon 6, 6), combinations thereof, and the like. The coupling features 75*a*, 75*b*, 75*c* may be connected to the lattice by adhesive, heat-sealing, ultrasonic welding, or the like. The coupling features 75*a*, 75*b*, 75*c* may be connected to the crib 90 by adhesive, heat-sealing, ultrasonic welding, or the like. During manufacture, the coupling features may be first connected to the lattice 68 and then to the crib 90, or may be connected to the crib 90 first and then to the lattice 68. The bonding of the lattice 68 to the crib 90, especially at its periphery minimizes hammocking.

Referring now to the fluid flow path, as described above, fluid (e.g. air) is supplied to the port connector 142 from the fluid source FS via the external tubing TUBE. Once the fluid reaches the port connector 142, the port connector 142 communicates the fluid to the low air loss manifold 110. As described above, the structure of the low air loss manifold 110 is not particularly limited provided that the structure is capable of communicating with the fluid source FS and directing and releasing the fluid in the crib assembly 50 towards the air passages 71 of the conforming layer 60. For example, when the low air loss manifold 110 includes the tubular conduit 111, the tubular conduit 111 receives the fluid from the port connector 142 and releases the fluid within the crib assembly 50 towards the air passages 71 of the lattice 68 of cells 70 of the conforming layer 60. To release the fluid, the tubular conduit 111 may include apertures, nozzles, jets, etc. Similarly, when the low air loss manifold 110 includes the punctured bladder 113, the punctured bladder 113 may include apertures, nozzles, jets, etc.

After the fluid is released by the low air loss manifold 110, the fluid travels through at least some of the fluid passages 71 of the lattice 68 of cells 70 of the conforming layer 60. However, even though each cell in the lattice 68 of cells 70 may have a passage, the fluid typically only travels through the fluid passages 71 in the lattice 68 of cells 70 located in a reduced zone (RZ) (FIG. 7). The location of the reduced zone (RZ) is located approximately in the location that would correspond to the torso of a patient. The reduced zone (RZ) may also include a portion of the area generally referred to as the head-end of the conforming layer 60. Typically, the reduced zone (RZ) does not extend to the foot-end of the conforming layer 60.

After the fluid travels through the fluid passages 71 of the lattice 68 of cells 70 within the reduced zone (RZ), the fluid is received by the spacer layer 116. Once received in the spacer layer 116, the fluid is dispersed underneath the top cover assembly 54 and over a surface area that is larger than the surface area of the reduced zone (RZ). Typically, the fluid is dispersed over substantially all of the lattice 68 of cells 70, including cells 70 located in the foot-end of the conforming layer 60. In other words, despite the fact that the fluid is only received by the spacer layer 116 in the reduced zone (RZ), the fluid is dispersed (i.e., supplied) by the spacer layer 116 over an area that is larger, and often significantly larger, than the reduced zone (RZ).

Notably, the 3-dimensional configuration of the spacer layer 116 allows the fluid to be dispersed across a surface area that is larger than the surface area of the reduced zone (RZ) even when the pressure is applied to the patient support surface 58 (i.e., a patient is resting on the patient support surface 58). This is because the fluid is capable of moving both vertically and laterally through the vertical pores VP (FIG. 10A) and lateral passages LP (FIG. 10B) of the spacer layer 116. For comparison purposes, if the spacer layer 116 was not present, when pressure is applied to the patient support surface 58, the top cover 54 could press against the lattice 68 of cells 70 and obstruct the fluid passages 71 in the lattice 68 of cells 70, thereby inhibiting fluid flow. However, the presence of the spacer layer 116 permits fluid to flow through the fluid passages 71 without being significantly inhibited by the top cover 54 and thus the patient support 32 maintains a relatively constant fluid flow even when pressure is applied to the patient support surface 58.

As described above, because the top cover assembly 54 of the cover assembly 52 is air impermeable but vapor permeable, moisture from under the patient passes through the top cover 54 and is carried away by the fluid dispersed by the spacer layer 116 across the reduced zone (RZ). Once dispersed by the spacer layer 116, the fluid caring the moisture is typically capable of escaping the crib assembly 50 and cover assembly 52 by exiting through the fastening device 57 (e.g. a zipper) about the sides of the cover assembly 52. Said differently, the fluid exits the cover assembly 52 through the fastening device 57 that joins the top cover assembly 54 with the bottom cover assembly 56.

Figure 8:
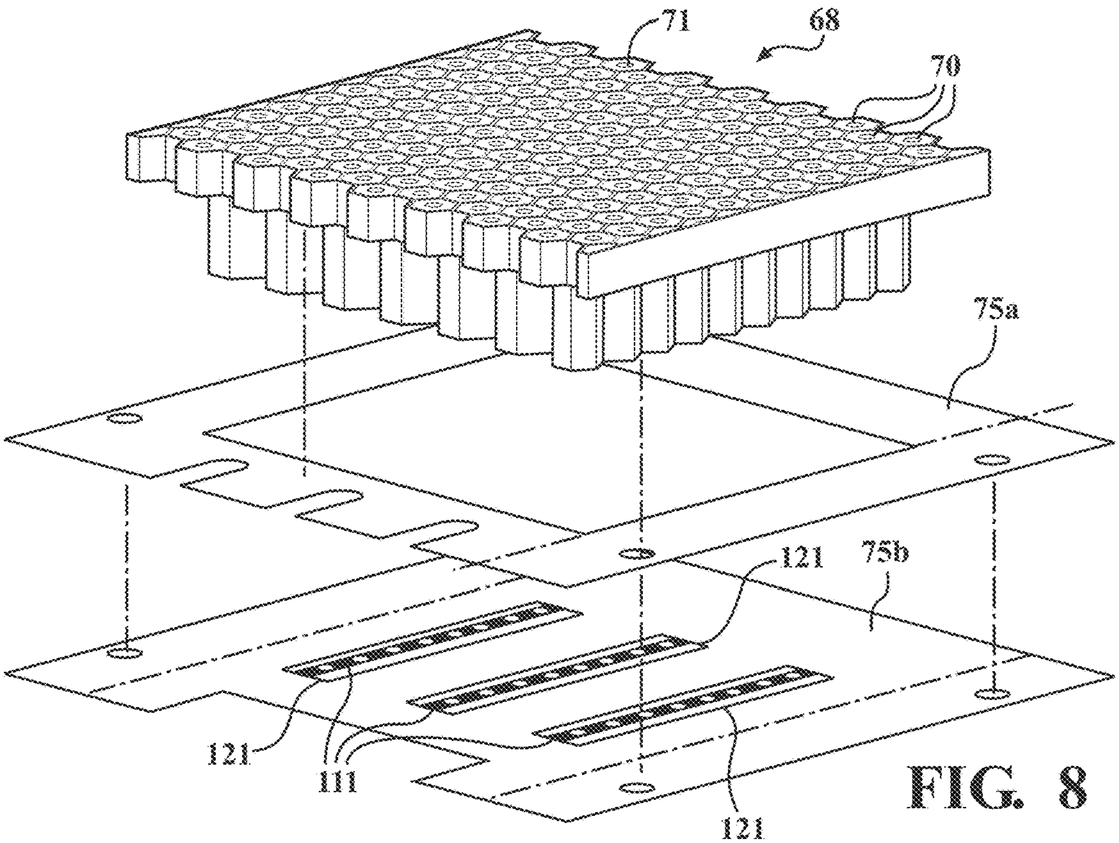
FIG. 8 is an exploded and perspective view of a lattice of cells illustrating coupling features used to connect the lattice of cells to a crib of the crib assembly.

As described above, the patient support 32 includes multiple optional components. However, when these optional components are positioned beneath the reduced zone (RZ) and between the spacer layer 116 and the low air loss manifold 110 the additional component typically also includes a fluid passage. The fluid passage of the additional components should permit the fluid delivered and released by the low air loss manifold 110 to reach the passages 71 of the lattice 68 of cells 70 about the reduced zone (RZ). For example, as best shown in FIG. 5, when the crib assembly 50 includes a lower conforming layer 62, the lower conforming layer 62 may include passages 119 that permit fluid released from the low air loss manifold 110 to reach the fluid passages 71 of the upper conforming layer 60 (for convenience, when the lower conforming layer 62 is included, the conforming layer 60 may be generally referred to as the upper conforming layer 60). As another example, as also shown in FIG. 8, when the lower coupling features 75*b* are included, the lower coupling features 75*b* may include passages 121 that exposes the tubular conduit 111 (or correspond to the passages 119 of the lower conforming layer) and permits fluid released from the low air loss manifold 110 to reach the fluid passages 71 of the lattice 68 of cells 70 of the upper conforming layer 60.

In certain embodiments, the conformable layer 60 is configured to establish a high volume of fluid flow. More specifically, in these embodiments the fluid contained within the passages 71 of the cells 70 of the conformable layer 60 has a defined volume, which is larger than the volume of material used to form the cells 70 of the conformable layer 60. It is to be appreciated that the fluid volume is defined by the volume of fluid present in the passages 71 of the cells 70 of the conformable layer 60. In these embodiments, a relatively large volume of fluid is capable of being moved by the fluid source FS. This is significant because fluid originating at the fluid source FS entering the patient support surface 58 typically has a relative humidity significantly lower (e.g. 50% RH) than the relative humidity of the moisture vapor entering the patient support surface 58 though the top cover assembly 54 (e.g. 90% RH). The significant difference between the relative humidity of fluid originating from the fluid source FS and the moisture vapor entering the patient support surface 58 through the top cover assembly 54, combined with the large volume of air being moved through the conformable layer 60 due to the fact that the fluid volume of the conformable layer 60 is greater than the material volume, establishes a highly efficient removal of moisture from the patient support 32 and consequently reduces the likelihood of the patient developing pressure sores/ulcers/injuries.

FIG. 11 illustrates the flow of fluid (e.g. air) from the low air loss manifold 110, through the passages 121 in the lower coupling features **75*b*, through a portion of the cells 70 in the reduced zone (RZ), and dispersing through the spacer layer 116 from the reduced zone (RZ) into a greater area above the lattice 68 of cells 70. The air is then shown traveling from the spacer layer 116 and out of the patient support 32 via the fastening device 57**.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support for supporting a patient, the patient support comprising:

a conformable layer including a lattice of cells each having a base and extending to a top portion disposed opposite the base to form a column, with at least some cells within the lattice having a fluid passage extending from the base through the top portion of the cell, wherein the top portion of the lattice of cells defines a patient support surface area spanning the lattice of cells, and wherein the fluid passages of the cells of the conformable layer define an air volume and further define a material volume at least partially surrounding the air volume with the air volume being larger than the material volume;

a spacer layer disposed above the conformable layer spanning the patient support surface area;

a cover assembly enclosing the conformable layer and the spacer layer; and a low air loss manifold disposed below the conformable layer and enclosed by the cover assembly, with a fluid flow path defined between a fluid source and the low air loss manifold, the low air loss manifold configured to direct and release the fluid towards the fluid passages of the conformable layer with the fluid passages configured to direct the fluid into a reduced zone having a surface area, and the spacer layer configured to receive the fluid in the reduced zone and disperse the fluid underneath a top surface of the cover assembly across a surface area larger than the surface area of the reduced zone.

2. The patient support of claim 1, wherein the spacer layer is configured to disperse the fluid across substantially all of the patient support surface area.

3. The patient support of claim 1, wherein the cover assembly is further defined as a top cover assembly, a bottom cover assembly, and a breathable structure configured to allow fluid dispersed by the spacer layer to exit the patient support.

4. The patient support of claim 3, wherein the breathable structure is a fastening device and further configured for coupling the top cover assembly and the bottom cover assembly.

5. The patient support of claim 4, wherein the top cover assembly is air impermeable and vapor permeable.

6. The patient support of claim 5, wherein the top cover assembly and the spacer layer cooperate to reduce or prevent bed sores on a patient.

7. The patient support of claim 1, wherein the spacer layer is further defined as a porous material of 3-dimensional woven fabric configured to allow the fluid flow to pass vertically and laterally through the spacer layer.

8. The patient support of claim 1, wherein the spacer layer includes elastic coupling features to secure the spacer layer to the conforming layer.

9. The patient support of claim 1, wherein the spacer layer is coated with a polymer and integral with the cover assembly to position the spacer layer over the conforming layer.

10. The patient support of claim 1, wherein the low air loss manifold includes tubular conduit defining a plurality of apertures for releasing the fluid towards the fluid passages of the conforming layer.

11. The patient support of claim 1, wherein the low air loss manifold includes a punctured bladder.

12. The patient support of claim 11, wherein the punctured bladder includes two polymeric layers welded together and a defining a plurality of apertures for releasing the fluid towards the fluid passage of the conforming layer.

13. The patient support of claim 1, wherein the reduced zone is located to correspond to a torso of a patient resting on the patient support.

14. The patient support of claim 13, wherein the reduced zone is located to correspond to the torso of the patient and a head end of the conforming layer.

15. The patient support of claim 14, wherein the reduced zone is not located at a foot end of the conforming layer.

16. The patient support of claim 1 further comprising a lower conforming layer positioned between the conforming layer and the low air loss manifold, with the lower conforming layer defining a passage to allow fluid released by the low air loss manifold to reach the fluid passages of the conforming layer.

17. The patient support of claim 1, wherein the lattice of cells is attached to a coupling feature with the coupling feature defining a passage to allow fluid released by the low air loss manifold to reach the fluid passages of the conforming layer.

18. The patient support of claim 1, wherein the fluid is air.

19. The patient support of claim 1, wherein the spacer layer is configured to disperse the fluid underneath a top surface of the cover assembly across the surface area larger than the reduced zone when the conforming layer is supporting a patient.

* * * * *